Figure 1:
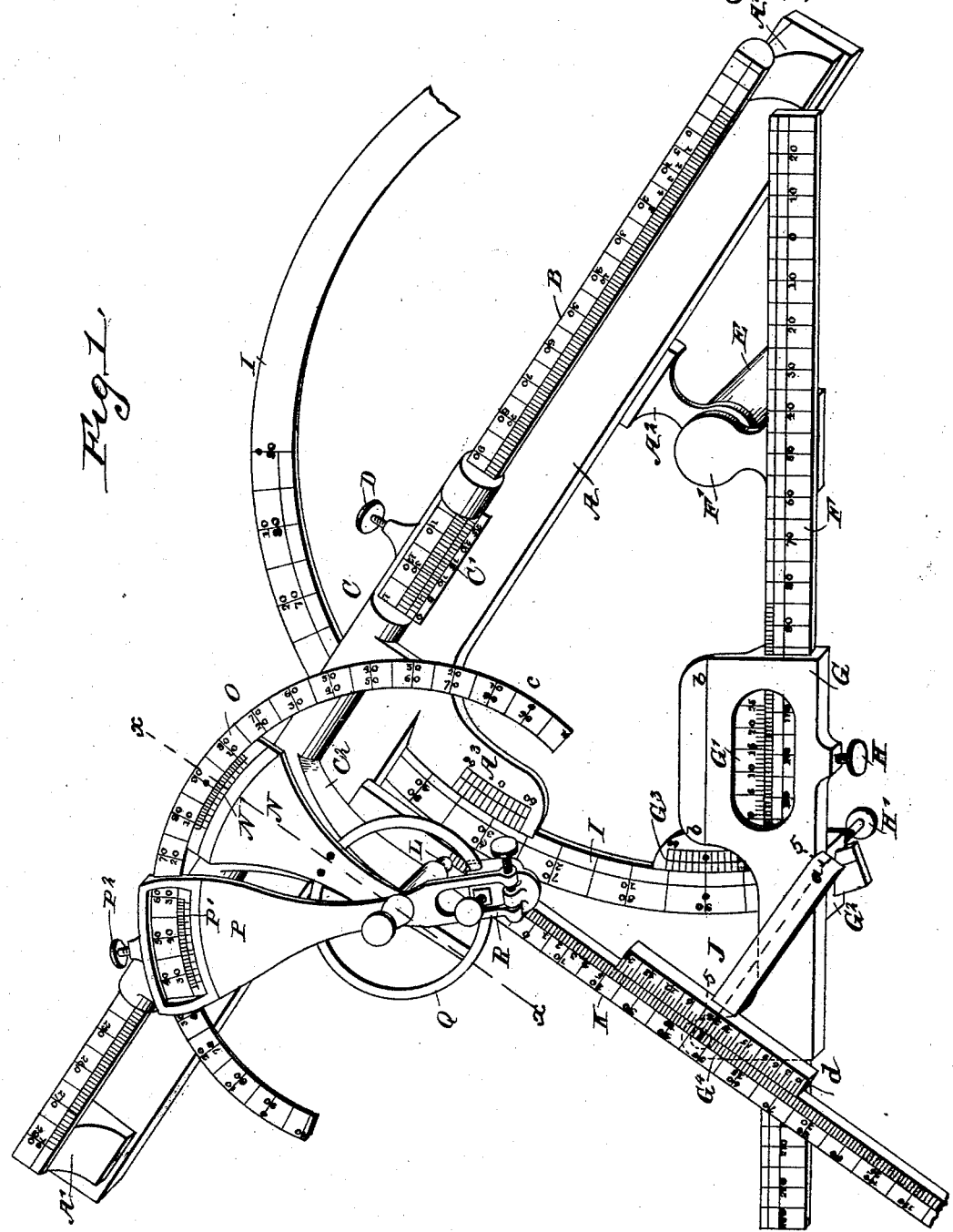

(No Model.) 2 Sheets—Sheet 1.

W. HINTON.
SURVEYING INSTRUMENT.

No. 524,591. Patented Aug. 14, 1894.

WITNESSES:
H. Walker
C. Sedgwick

INVENTOR
W. Hinton
BY Munn & Co
ATTORNEYS.

(No Model.) 2 Sheets—Sheet 2.
W. HINTON.
SURVEYING INSTRUMENT.
No. 524,591. Patented Aug. 14, 1894.
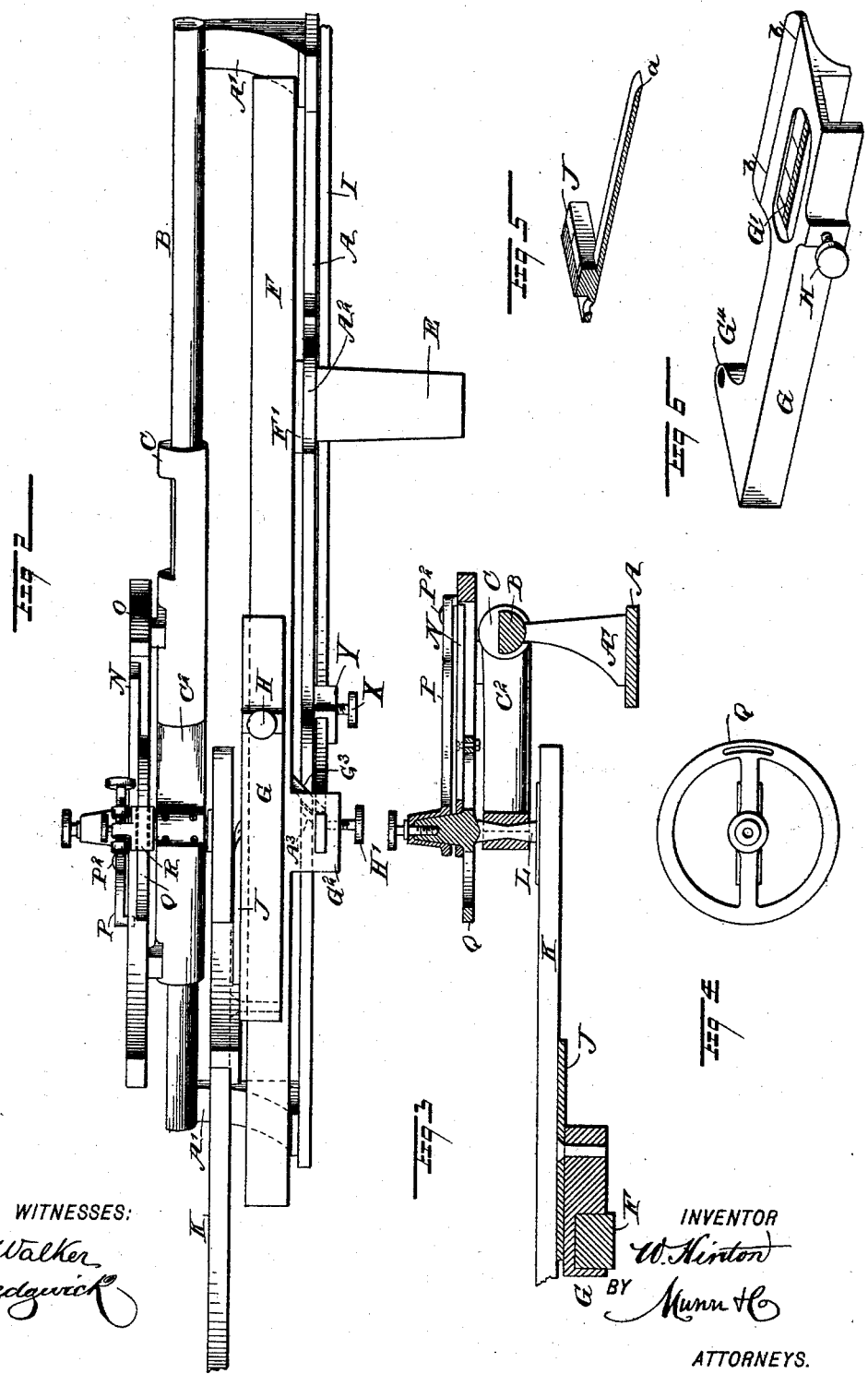
WITNESSES:
H. Walker
C. Sedgwick
INVENTOR
W. Hinton
BY
Munn & Co
ATTORNEYS.

UNITED STATES PATENT OFFICE.

WILLIAM HINTON, OF HINTON, WEST VIRGINIA.

SURVEYING-INSTRUMENT.

SPECIFICATION forming part of Letters Patent No. 524,591, dated August 14, 1894.

Application filed May 25, 1893. Serial No. 475,495. (No model.)

*To all whom it may concern:*

Be it known that I, WILLIAM HINTON, of Hinton, in the county of Summers and State of West Virginia, have invented a new and Improved Surveying-Instrument, of which the following is a full, clear, and exact description.

The object of the invention is to provide a new and improved surveying instrument, which is comparatively simple and durable in construction, arranged for pocket use, and designed to enable the engineer or surveyor to directly calculate triangles without the use of plotting or other instruments, and for reading latitudes and departures for any course (down to minutes if desired) for chains, poles and links, at a single observation.

The invention consists of a straight meridian scale, a distance scale pivotally-connected with the said meridian scale, sliding and stationary verniers on the said scale, and a protractor held adjustably in one of the stationary verniers and adapted to be read on it, and the other vernier.

The invention also consists of certain parts and details, and combinations of the same, as will be hereinafter described and then pointed out in the claims.

Reference is to be had to the accompanying drawings forming a part of this specification, in which—

Figure 1 is a perspective view of the improvement. Fig. 2 is a front elevation of the same. Fig. 3 is a sectional elevation on line 3—3 of Fig. 1. Fig. 4 is a detail view of the ring Q shown in Fig. 1. Fig. 5 is a longitudinal section of the T-square J on line 5—5 of Fig. 1; and Fig. 6 is a detail perspective view of the slide G.

The improved surveying instrument is provided with a base A, on the ends of which are secured short standards A', supporting a distance scale B, having a graduation reading to poles and chains, and on the said scale is held adjustably a slide C, provided with a vernier C', for reading off links on the scale of the distance scale B. The slide C is adapted to be fastened in place on the scale B by a set screw D.

On the inner edge of the base A is secured an arm $A^2$, connected by a pivot E with a similar arm F', attached to a straight meridian scale F, formed with a graduation reading to poles and chains. On this meridian scale F is held adjustably, a slide G, formed with a vernier G' reading to links, for obtaining the sub-divisions of the chains read on the graduation of the scale F. The slide G is adapted to be fastened in place on the scale F by a set screw H, and on the under side of the said scale is formed a bearing $G^2$, engaged by a protractor I, graduated in the usual manner and adapted to be secured in place in the bearing $G^2$ by a set screw H'. The graduation of the protractor I can be read on a second vernier $G^3$, attached to the under side of the meridian scale F and reading to minutes and sub-divisions, and the said protractor can also be read on a vernier $A^3$, of minutes and sub-divisions, the said vernier forming a part of the base A.

On the forward end of the slide G is arranged an extension $G^4$, on which is pivoted a T-square J, having its head graduated, to form a scale as illustrated in the drawings and fitted on the departure scale K, rigidly secured to a pivot L, mounted to turn in suitable bearings in a bracket $C^2$, projecting from the slide C. On the pivot L and near the upper end thereof is secured an arm N, provided with a vernier N' reading on a second protractor O, secured on the slide C. The protractor O is also engaged by an arm P, fulcrumed loosely on the pivot L and provided with a vernier P' for reading off on the graduation of the said protractor O. The arm P is adapted to be fastened in place on the said protractor by a set screw $P^2$ and the inner end of the arm is adapted to be fastened on a ring Q secured to the arm N and arranged concentric with the pivot L. A suitable clamping device R is employed to fasten the arm P to the ring Q.

The device is used as follows: The distance scale B and the meridian scale F are arranged relatively to each other in such a manner that when their slides C and G indicate by their verniers C' and G', at zero of the said scales, then the center of the pivot L is directly over the center of the pivot E and likewise the center of the T-square pivot is over the center of the pivot E. When the arm N is unfastened from the protractor O by loosening the clamping device R, then the departure scale K can be moved forward or backward, so as to turn the pivot L, whereby the arm N is caused to swing to indicate along any desired point on the protractor O. In case the arm P is fastened by the clamp R to the ring Q and its set screw $P^2$ is unscrewed, then the said arm P will move with the arm N, but when the clamp R is loosened the said arm P can be moved independent of the arm N. The protractor I is used to measure the angle between the two scales B and F, it being understood that the angle is read on the vernier $A^3$ which latter extends over the inner edge of the said protractor I, while the other vernier $G^3$ extends along the edge so as to permit of passing the vernier $G^3$ under the vernier $A^3$ when adjusting the instrument.

For the purpose of taking the latitude and departure of any course, it is only necessary to clamp the protractor I to the meridian scale F, so as to have the zero point on the vernier $G^3$ coincide with the zero on the protractor, which may be done by means of the screw X entering the bearing Y which is secured to the under side of the base A and constitutes a guide for the protractor after which the scales F and B are swung apart to read off the degree wanted, say for instance, thirty-two degrees thirty minutes, as seen in the drawings, and then the protractor is clamped in place by the set screw H'. The operator then loosens the set screw H to free the slide G on the scales K and F, and then presses gently with one hand on the departure scale K at the point opposite the T-square J until the point $a$ on the outer end of the T-square plate coincides with the meridian line $b\ b$ on the slide G, which line extends through the center of the pivot E parallel to the meridian scale F. The operator then reads the departure for whole chains or poles from opposite the zero point on the left hand arm of the head of the T-square J, and the links by the verniers toward the center of the T-square head. In the same way the operator can read the latitude scale from the vernier G'.

Now, for the purpose of measuring triangles of any proportion or degree, the operator proceeds in the same way, as above, until he has obtained the proper bearing set off at the zero point of the vernier $A^3$, which, as shown in the drawings, indicates thirty-two degrees thirty minutes. The operator then moves the slide C on the distance scale B to the distance wanted, say for instance, 32.12 chains (about the distance shown in the drawings), then the operator takes hold of the revolving departure scale K, and pushes outward until the index vernier arm N coincides with the zero point $c$ on the protractor O, and then the operator loosens the clamp R and moves the other index arm P to the left to read thirty-two degrees thirty minutes, the same as the first course reads at the vernier $A^3$. This gives the difference between the zero points on the protractor I and the meridian scale F, so that the operator only needs to read the second course from the index arm P instead of the index arm N, and for this purpose turns the scale K till the arm P reaches the degree called for on the second line of the protractor O and then he clamps the arm P in place thereon by the set screw $P^2$. The operator then lets go of the set screw H' and takes hold of the protractor I and set screw H and then slides the meridian scale F by pressing gently on the end thereof until the zero point at $d$ of the head of the T-square J indicates the distance wanted on the second line which then would be counted on the latitude scale opposite $d$. The operator now has all the parts of the triangle wanted, and it is only necessary to read the length of the base of the triangle at the vernier G' on the meridian scale F, and proceed in the same manner as above described, relative to getting latitude and departure. That is, the operator loosens the set screw H and presses on the revolving departure scale K until point $a$ coincides with the meridian line $b\ b$ and then reads the perpendicular at the point $d$, as in the case of the departure above described.

It will be seen from the foregoing that the instrument can be easily manipulated to obtain latitude and departure for any course in degrees and minutes, and distances in poles, chains and links, without further calculation. It also enables the engineer or surveyor to calculate triangles directly without the use of a plotting or other instrument.

Having thus fully described my invention, I claim as new and desire to secure by Letters Patent—

1. A surveying instrument, comprising a straight meridian scale, a distance scale, pivotally-connected with the meridian scale both scales having graduated edges arranged to the side of their common pivot, stationary verniers on the said scales, and a protractor held adjustably in one of the verniers and adapted to be read on the said verniers, substantially as shown and described.

2. A surveying instrument, comprising a pivot and arms mounted to turn thereon, a meridian scale connected with the outer end of one of the said arms, a distance scale connected with the outer end of the other arm, both scales having their graduated edges arranged to the side of the said pivot, a protractor connected with each of the scales and arranged concentrically with the said pivot, independent slides held on each of the said scales, and two scales each pivotally connected with one of the said slides, as and for the purpose set forth.

3. A surveying instrument, comprising a straight meridian scale, a distance scale pivotally-connected with the said meridian scale, vernier slides held adjustably on the said scales, a protractor secured on the slide of the distance scale, an arm indicating on the said protractor, and a departure scale connected with pivot of the said arm, substantially as shown and described.

4. A surveying instrument, comprising a straight meridian scale, a distance scale pivotally-connected with the said meridian scale, vernier slides held adjustably on the said scales, a protractor secured on the slide of the distance scale, an arm indicating on the said protractor, a departure scale connected with pivot of the said arm, and a T-square pivoted on the slide of the meridian scale and adapted to be read in connection with the said departure scale, substantially as shown and described.

5. A surveying instrument, comprising a straight meridian scale, a distance scale pivotally-connected with the said meridian scale, vernier slides held adjustably on the said scales, a protractor secured on the slide of the distance scale, an arm indicating on the said protractor, a departure scale connected with pivot of the said arm, a T-square pivoted on the slide of the meridian scale and adapted to be read in connection with the said departure scale, the plate of the said T-square being arranged to be read in connection with a meridian line on the slide of the meridian scale, substantially as shown and described.

6. A surveying instrument, comprising a straight meridian scale, a distance scale pivotally-connected with the said meridian scale, vernier slides held adjustably on the said scales, a protractor secured on the slide of the distance scale, an arm indicating on the said protractor, a departure scale connected with pivot of the said arm, and a second arm held loosely on the pivot of the said first named arm and also adapted to indicate on the said protractor, substantially as shown and described.

7. A surveying instrument, comprising a straight meridian scale, a distance scale pivotally-connected with the said meridian scale, vernier slides held adjustably on the said scales, a protractor secured on the slide of the distance scale, an arm indicating on the said protractor, a departure scale connected with pivot of the said arm, a second arm held loosely on the pivot of the said first named arm and also adapted to indicate on the said protractor, and a clamp for fastening the said second arm on a circle attached to the first named arm, substantially as shown and described.

WILLIAM HINTON.

Witnesses:
E. L. BULER,
W. L. HINTON.